US010862123B2

(12) United States Patent
Eberle et al.

(10) Patent No.: US 10,862,123 B2
(45) Date of Patent: Dec. 8, 2020

(54) BINDER MATERIALS FOR ANODE AND CATHODE MATERIALS OF LITHIUM CELLS

(71) Applicants: Robert Bosch GmbH, Stuttgart (DE); Samsung SDI Co., Ltd., Yongin-si (KR)

(72) Inventors: Felix Eberle, Kyoto (JP); Ulrich Lange, Aichtal (DE)

(73) Assignees: Robert Bosch GmbH, Stuttgart (DE); Samsung SDI CO., Ltd., Yongin-Si (KR)

( * ) Notice: Subject to any disclaimer, the term of this patent is extended or adjusted under 35 U.S.C. 154(b) by 0 days.

(21) Appl. No.: 14/566,887

(22) Filed: Dec. 11, 2014

(65) Prior Publication Data
US 2015/0162615 A1 Jun. 11, 2015

(30) Foreign Application Priority Data
Dec. 11, 2013 (DE) .................. 10 2013 225 570

(51) Int. Cl.
*H01M 4/62* (2006.01)
*H01B 1/12* (2006.01)
*C08K 3/04* (2006.01)
*C08G 73/02* (2006.01)
*H01M 4/13* (2010.01)
*H01M 10/052* (2010.01)

(52) U.S. Cl.
CPC ........ *H01M 4/622* (2013.01); *C08G 73/0266* (2013.01); *C08K 3/04* (2013.01); *H01B 1/127* (2013.01); *H01B 1/128* (2013.01); *C08G 2261/312* (2013.01); *C08G 2261/3221* (2013.01); *C08G 2261/3223* (2013.01); *H01M 4/13* (2013.01); *H01M 10/052* (2013.01)

(58) Field of Classification Search
CPC ...... H01M 4/622; H01M 4/131; H01M 4/133; H01M 4/134; H01M 4/136; H01M 4/405; H01M 4/485; H01M 4/5825; H01M 4/12; H01M 10/052; H01M 10/0568; H01M 10/0569; H01B 1/128
See application file for complete search history.

(56) References Cited

U.S. PATENT DOCUMENTS

| 4,250,294 | A | * | 2/1981 | Hagel | .................. | C06B 45/105 |
| | | | | | | 149/105 |
| 6,024,895 | A | | 2/2000 | Shimizu et al. | | |
| 2003/0091899 | A1 | | 5/2003 | Matsubara et al. | | |
| 2004/0131934 | A1 | | 7/2004 | Sugnaux et al. | | |
| 2014/0106217 | A1 | * | 4/2014 | Lee | ....................... | H01M 4/622 |
| | | | | | | 429/217 |

FOREIGN PATENT DOCUMENTS

| DE | 0 199 175 | A2 | | 10/1986 |
| DE | 42 15 154 | A1 | | 11/1992 |
| EP | 0083059 | | * | 12/1982 |
| EP | 0083059 | A | * | 12/1982 |
| EP | 0 199 175 | A2 | | 10/1986 |
| EP | 1 881 544 | A1 | | 1/2008 |
| JP | 2004256640 | | * | 9/2004 |
| JP | 2004256640 | A | * | 9/2004 |
| JP | 2010160983 | | * | 7/2010 |
| JP | 2010160983 | A | * | 7/2010 |
| WO | 20101113876 | A1 | | 10/2010 |

OTHER PUBLICATIONS

Guo, Hua, Polyphenylene ether Adhesive, Jun. 24, 2004, ip.com, 24 pgs. (Year: 2420).*
Veeraraghavan et al., Study of polypyrrole graphite composite as anode material for secondary lithium-ion batteries, Journal of Power Sources, 2002, pp. 377-387, 109, Elsevier Science B.V., www.elsevier.com.
Courtel et al., Water-soluble binders for MCMB carbon anodes for lithium-ion batteries, Journal of Power Sources, 2011, pp. 2128-2134, 196.
Witker et al., Lithium ion and electronic conductivity in 3-(oligoethylene oxide) thiophene comb-like polymers, Journal of Power Sources, 2006, pp. 525-532, 156.
Hou et al., Design and Synthesis of Hierarchical $MnO_2$ Nanospheres/Carbon Nanotubes/Conducting Polymer Ternary Composite for High Performance Electrochemical Electrodes, American Chemical Society, NANO Letters, 2010, pp. 2727-2733, 10.
Yamamoto et al., SBR Binder (for Negative Electrode) and ACM Binder (for Positive Electrode), Lithium-Ion Batteries, 2009, pp. 163-179, Springer Science+Business Media, LLC, Yoshio, et al. Editors, New York.

* cited by examiner

*Primary Examiner* — Ula C Ruddock
*Assistant Examiner* — Thomas H. Parsons
(74) *Attorney, Agent, or Firm* — Walter Ottesen, P.A.

(57) ABSTRACT

Electrode materials and binder materials are used for lithium cells, such as lithium ion cells. To optimize the specific power [W/kg] or power density [W/l] and specific energy [Wh/kg] or energy density [Wh/l], at least one electrically conducting, polymeric binder is used which is selected from the group consisting of polyphenylenes, polypyrroles, polyanilines, polythiophenes and lithium salts thereof. The at least one electrically conducting, polymeric binder is used in a lithium cell.

19 Claims, No Drawings

BINDER MATERIALS FOR ANODE AND CATHODE MATERIALS OF LITHIUM CELLS

This application claims priority under 35 U.S.C. § 119 to patent application number DE 10 2013 225 570.5, filed on Dec. 11, 2013 in Germany, the disclosure of which is incorporated herein by reference in its entirety. This application describes and claims certain subject matter that was developed within the scope of a written joint research agreement between Robert Bosch GmbH and Samsung SDI Co., Ltd., which was in effect prior to the inventive activities resulting in the present application and claims.

BACKGROUND

The disclosure relates to electrode materials and binder materials for lithium cells and to lithium cells equipped therewith.

Lithium ion battery cells have an anode (negative electrode) and a cathode (positive electrode).

The anode conventionally comprises an active material, which is also referred to as anode active material and may be graphite, for example. Moreover, the anode customarily comprises a binder material and optionally a conductive additive.

The cathode here conventionally comprises a different active material, called a cathode active material, which may be lithium cobalt oxide ($LiCoO_2$), for example. Moreover, the cathode customarily comprises a binder material and a conductive additive, for example acetylene black and/or industrial carbon black.

In the charging and discharging of the battery cell, $Li^+$ ions are reversibly intercalated or deintercalated at the electrodes.

The binder material most frequently used at present is polyvinylidene fluoride (PVdF). Polyvinylidene fluoride is relatively stable electrochemically and can therefore be used both on the anode side and on the cathode side. Polyvinylidene fluoride, however, has a low ion conductivity and electron conductivity, is insoluble in water, and is only a poor binder of graphite, which is frequently used as active material in the anode.

Styrene-butadiene rubber (SBR) is a binder material more suitable for the anode. Styrene-butadiene rubber, by virtue of the double bonds present, is able to bind graphite substantially more effectively than is polyvinylidene fluoride, and is sufficiently reduction-stable, and can also be dispersed in water. Styrene-butadiene rubber is used in more recent binder systems together with carboxymethylcellulose (CMC).

Carboxymethylcellulose dissolves outstandingly in water and can be used as a thickener for adjusting the viscosity of the electrode composition. While carboxymethylcellulose is a good binder for the active material, it can only be used in combination with styrene-butadiene rubber.

Styrene-butadiene rubber and carboxymethylcellulose, however, can only be used on the anode side, since both binders lack sufficient oxidation stability for use on the cathode side.

On the cathode side, acrylate rubber (ACM) exhibits outstanding oxidation stability and good adhesion properties. Like polyvinylidene fluoride, however, acrylate rubber can only be dispersed or dissolved in organic solvents, such as N-methyl-2-pyrrolidone (NMP).

A review of other possible binder materials is given in the article by Yamamoto et al. (Lithium-Ion Batteries, Springer Verlag, N Y, 2009, pp. 163-179).

Hou et al. (Nano Lett., 10, 2010, pp. 2727-2733), Courtel et al. (J. Power Sources, 196, 2011, pp. 2128-2134), Veeraraghavan et al. (J. Power Sources, 109, 2002, pp. 377-387) and Witker et al. (J. Power Sources, 156, 2006, pp. 525-532) discuss the use of electrically conductive polymers, such as poly-3,4-ethylenedioxythiophene (PEDOT)/polystyrenesulfonate (PSS), polythiophenes or polypyrroles, as binder materials.

Publication WO 2010/113876 A1 describes a binder for a positive electrode of a lithium ion cell, the binder comprising a polythiophene which is substituted by a polyether group, an alkoxy group, an alkoxyalkyl group or a polyether-substituted alkyl group.

Publication US 2003/0091899 A1 describes an electrode material comprising a binder which comprises a water-soluble, electrically conductive polymer, a water-soluble polymer and an active material.

Publication EP 1 881 544 A1 describes a secondary lithium cell which comprises a conducting polymer, such as polyaniline.

SUMMARY

The present disclosure provides an electrode material, more particularly an anode material or a cathode material, for a lithium cell, for example for a lithium ion cell, which comprises at least one active material, for example a lithium intercalation material, and also at least one polymeric binder.

DETAILED DESCRIPTION

The at least one polymeric binder here is, in particular, electrically conducting. For this purpose it is possible in particular to use polymers based on benzene, aniline, pyrrole and thiophene, such as polyphenylenes, polyanilines, polypyrroles and polythiophenes, which have a conjugated π-electron system and are able consequently to endow the binder with electrical conductivity.

It is possible accordingly and advantageously to lower the "charge transfer" resistance in the electrodes and to provide better electrical contacting to the active material, for example in the anode material and/or cathode material. This makes it possible in turn to reduce, or even to do away entirely with, the fraction of electrical conductive additives, such as conductive carbon blacks, for example acetylene black and/or industrial carbon black, in the material. As a result, in turn, it is possible advantageously to reduce the electrode weight and/or to increase the fraction of active material in the material, for example in wt % and/or vol %. This makes it possible in turn, advantageously, to provide lithium cells, for example lithium ion batteries, having an increased specific power [W/kg] or power density [W/l] and specific energy [Wh/kg] or energy density [Wh/l].

Because of the high double bond fraction and because of the conjugated electron system, improved binding of the active material can be achieved by polyphenylenes, polyanilines, polypyrroles and polythiophenes, advantageously, as compared with conventional binders, such as polyvinylidene fluoride (PVdF). Moreover, such binders are able advantageously to achieve a decisive improvement in the stability and also, as a result, in particular, in the quality of the anode or cathode, respectively.

Polyphenylenes, polyanilines, polypyrroles and polythiophenes may, moreover, advantageously have a sufficiently high electrochemical stability in the potential range of lithium cells, for example lithium ion batteries. More particularly, polyphenylenes, polyanilines, polypyrroles and polythiophenes may be oxidation-stable in the potential range of the cathode of a lithium cell, for example lithium ion cell, and reduction-stable in the potential range of the anode of a lithium cell, for example lithium ion cell.

Moreover, polyphenylenes, polyanilines, polypyrroles and polythiophenes may advantageously have a high melting point.

The at least one binder may more particularly be selected from the group consisting of polyphenylenes of the general, chemical formula:

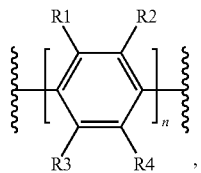

polypyrroles of the general, chemical formula:

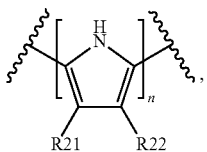

polyanilines of the general, chemical formula:

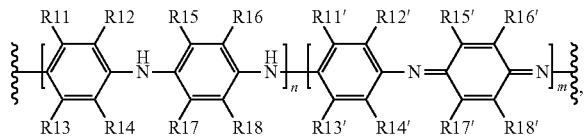

polythiophenes of the general, chemical formula:

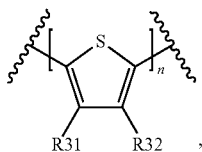

and lithium salts thereof.

Here, n or m is, more particularly, the number of repeating units.

R1, R2, R3, R4, R11, R12, R13, R14, R15, R16, R17, R18, R11', R12', R13', R14', R15', R16', R17', R18', R21, R22, R31 and R32 may each independently of one another be hydrogen (—H), a hydroxyl group (—OH), a thiol group (—SH), a carboxylic acid group (—COOH), a sulfonic acid group (—SO$_3$H), a nitric ester group (—NO$_3$), a nitro group (—NO$_2$), or an alkyl group functionalized with (at least) a hydroxyl group (—OH), thiol group (—SH), carboxylic acid group (—COOH), sulfonic acid group (—SO$_3$H), nitric ester group (—NO$_3$) and/or nitro group (—NO$_2$), in particular a group of any desired length, for example having ≥1 to ≤8 carbon atoms, for example having ≥1 to ≤4 carbon atoms and/or ≥4 to ≤8 carbon atoms, or an alkyl group, more particularly a group of any desired length, for example having ≥2 to ≤4 carbon atoms, with ester function and/or ether function, for example a polyether, such as polyethylene glycol (PEG), or an alkoxy group (—OR), or —OLi, —SLi, —COOLi or —SO$_3$Li, or an alkyl group functionalized with (at least one) —OLi, —SLi, —COOLi and/or —SO$_3$Li.

If the at least one binder comprises a polyphenylene lithium salt, polypyrrole lithium salt, polyaniline lithium salt and/or polythiophene lithium salt, it is possible in particular for at least one of the substituents R1, R2, R3, R4, R11, R12, R13, R14, R15, R16, R17, R18, R11', R12', R13', R14', R15', R16', R17', R18', R21, R22, R31 and R32 to be —OLi, —SLi, —COOLi or —SO$_3$Li, or an alkyl group functionalized with (at least one) —OLi, —SLi, —COOLi and/or —SO$_3$Li.

In one embodiment the at least one polymeric binder comprises a polyphenylene, more particularly of the general, chemical formula:

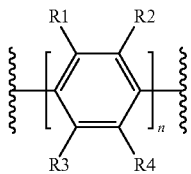

or a lithium salt thereof. The at least one polymeric binder may optionally be a polyphenylene of this kind and/or lithium salt thereof.

Polyphenylenes of this kind are notable advantageously for high electrical conductivity and also for high chemical and electrochemical stability.

Here, n is, in particular, the number of repeating units.

R1, R2, R3 and R4 may each independently of one another be hydrogen (—H), a hydroxyl group (—OH), a thiol group (—SH), a carboxylic acid group (—COOH), a sulfonic acid group (—SO$_3$H), a nitric ester group (—NO$_3$), a nitro group (—NO$_2$), or an alkyl group functionalized with (at least) a hydroxyl group (—OH), thiol group (—SH), carboxylic acid group (—COOH), sulfonic acid group (—SO$_3$H), nitric ester group (—NO$_3$) and/or nitro group (—NO$_2$), in particular a group of any desired length, for example having ≥1 to ≤4 carbon atoms, or an alkyl group, more particularly a group of any desired length, for example having ≥2 to ≤4 carbon atoms, with ester function and/or ether function, for example a polyether, such as polyethylene glycol (PEG), or an alkoxy group (—OR), or —OLi, —SLi, —COOLi or —SO$_3$Li, or an alkyl group functionalized with (at least one) —OLi, —SLi, —COOLi and/or —SO$_3$Li.

If the polyphenylene is a lithium salt, it is possible in particular for at least one of the substituents R1, R2, R3 and R4 to be —OLi, —SLi, —COOLi or —SO$_3$Li, or an alkyl group functionalized with (at least one) —OLi, —SLi, —COOLi and/or —SO$_3$Li.

In another, alternative or additional, embodiment the at least one polymeric binder comprises a polypyrrole, more particularly of the general, chemical formula

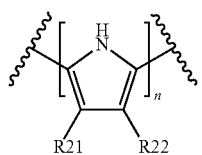

or a lithium salt thereof. The at least one polymeric binder may optionally be a polypyrrole of this kind or lithium salt thereof.

Polypyrroles of this kind are advantageously electrically conducting. It is possible, moreover, through the reductive potential of the anode and through the oxidative potential of the cathode, additionally to generate free charge carriers therein, which may further increase the electrical conductivity.

Here, n is, in particular, the number of repeating units.

R21 and R22 may each independently of one another be hydrogen (—H), a hydroxyl group (—OH), a thiol group (—SH), a carboxylic acid group (—COOH), a sulfonic acid group (—SO$_3$H), a nitric ester group (—NO$_3$), a nitro group (—NO$_2$), or an alkyl group functionalized with (at least) a hydroxyl group (—OH), thiol group (—SH), carboxylic acid group (—COOH), sulfonic acid group (—SO$_3$H), nitric ester group (—NO$_3$) and/or nitro group (—NO$_2$), in particular a group of any desired length, for example having ≥1 to ≤4 carbon atoms, or an alkyl group, more particularly a group of any desired length, for example having ≥2 to ≤4 carbon atoms, with ester function and/or ether function, for example a polyether, such as polyethylene glycol (PEG), or an alkoxy group (—OR), or —OLi, —SLi, —COOLi or —SO$_3$Li, or an alkyl group functionalized with (at least one) —OLi, —SLi, —COOLi and/or —SO$_3$Li.

If the polypyrrole is a lithium salt, it is possible in particular for at least one of the substituents R21 and/or R22 to be —OLi, —SLi, —COOLi or —SO$_3$Li, or an alkyl group functionalized with (at least one) —OLi, —SLi, —COOLi and/or —SO$_3$Li.

In a further, alternative or additional, embodiment the at least one polymeric binder comprises a polythiophene, more particularly of the general, chemical formula:

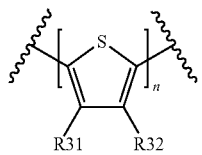

or a lithium salt thereof.

The at least one polymeric binder may optionally be a polythiophene of this kind or lithium salt thereof.

Polythiophenes of this kind are advantageously electrically conducting. It is possible, moreover, through the reductive potential of the anode and through the oxidative potential of the cathode, additionally to generate free charge carriers therein, which may further increase the electrical conductivity.

Here, n is, in particular, the number of repeating units.

R31 and R32 may each independently of one another be hydrogen (—H), a hydroxyl group (—OH), a thiol group (—SH), a carboxylic acid group (—COOH), a sulfonic acid group (—SO$_3$H), a nitric ester group (—NO$_3$), a nitro group (—NO$_2$), or an alkyl group functionalized with (at least) a hydroxyl group (—OH), thiol group (—SH), carboxylic acid group (—COOH), sulfonic acid group (—SO$_3$H), nitric ester group (—NO$_3$) and/or nitro group (—NO$_2$), in particular a group of any desired length, for example having ≥1 to ≤4 carbon atoms, or an alkyl group, more particularly a group of any desired length, for example having ≥2 to ≤4 carbon atoms, with ester function and/or ether function, for example a polyether, such as polyethylene glycol (PEG), or an alkoxy group (—OR), or —OLi, —SLi, —COOLi or —SO$_3$Li, or an alkyl group functionalized with (at least one) —OLi, —SLi, —COOLi and/or —SO$_3$Li.

If the polythiophene is a lithium salt, it is possible in particular for at least one of the substituents R31 and/or R32 to be —OLi, —SLi, —COOLi or —SO$_3$Li, or an alkyl group functionalized with (at least one) —OLi, —SLi, —COOLi and/or —SO$_3$Li.

In a further, alternative or additional, embodiment the at least one polymeric binder comprises a polyaniline, more particularly of the general, chemical formula:

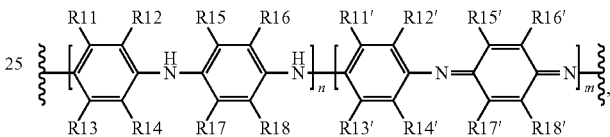

or a lithium salt thereof. The at least one polymeric binder may optionally be a polyaniline of this kind or lithium salt thereof.

Polyanilines of this kind are notable advantageously for high conductivity and also good thermal and chemical stability.

Here, n and m are, in particular, the number of repeating units.

R11, R12, R13, R14, R15, R16, R17, R18, R11', R12', R13', R14', R15', R16', R17' and R18' may each independently of one another be hydrogen (—H), a hydroxyl group (—OH), a thiol group (—SH), a carboxylic acid group (—COOH), a sulfonic acid group (—SO$_3$H), a nitric ester group (—NO$_3$), a nitro group (—NO$_2$), or an alkyl group functionalized with (at least) a hydroxyl group (—OH), thiol group (—SH), carboxylic acid group (—COOH), sulfonic acid group (—SO$_3$H), nitric ester group (—NO$_3$) and/or nitro group (—NO$_2$), in particular a group of any desired length, for example having ≥1 to ≤4 carbon atoms, or an alkyl group, more particularly a group of any desired length, for example having ≥2 to ≤4 carbon atoms, with ester function and/or ether function, for example a polyether, such as polyethylene glycol (PEG), or an alkoxy group (—OR), or —OLi, —SLi, —COOLi or —SO$_3$Li, or an alkyl group functionalized with (at least one) —OLi, —SLi, —COOLi and/or —SO$_3$Li.

If the polythiophene is a lithium salt, it is possible in particular for at least one of the substituents R11, R12, R13, R14, R15, R16, R17, R18, R11', R12', R13', R14', R15', R16', R17' and R18' to be —OLi, —SLi, —COOLi or —SO$_3$Li, or an alkyl group functionalized with (at least one) —OLi, —SLi, —COOLi and/or —SO$_3$Li.

In one configuration, the at least one binder comprises or is a polyphenylene of the general, chemical formula

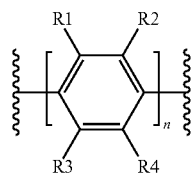

or a lithium salt thereof.

More particularly the at least one polymeric binder is electrically and ionically conducting. Functionalized polyphenylenes, polyanilines, polypyrroles and polythiophenes may advantageously endow the binder, in addition to an electrical conductivity, with an ionic conductivity, more particularly lithium ion conductivity, as well.

In particular, polyphenylenes, polyanilines, polypyrroles and polythiophenes may be provided with ionic conductivity, more particularly lithium ion conductivity, by functionalization with the following polar and/or ionic side groups:
—OH, —SH, —COOH, —SO₃H, —NO₃ or —NO₂, or
an alkyl group functionalized with —OH, —SH, —COOH, —SO₃H, —NO₃ and/or —NO₂, or
an alkyl group with ester function and/or ether function, or
an alkoxy group, or
—OLi, —SLi, —COOLi or —SO₃Li, or
an alkyl group functionalized with —OLi, —SLi, —COOLi and/or —SO₃Li.

In this way it is possible advantageously to make them not only electrically conducting but also, additionally, ionically conducting as well, more particularly conducting lithium ions.

Accordingly and advantageously it is likewise possible to reduce the charge transfer resistance in the electrodes and to achieve better ionic contacting of the active material, in the anode material and/or cathode material, for example. This makes it possible in turn, advantageously, to reduce the fraction of conductive additives conducting lithium ions in the material, or even to do without such additives entirely. Consequently it is possible in turn, advantageously, to reduce the electrode weight or increase the fraction of active material in the material, in wt % and/or vol %, for example. This makes it possible in turn, again advantageously, to provide lithium cells, for example lithium ion batteries, having a further-increased specific power [W/kg] or power density [W/l] and specific energy [Wh/kg] or energy density [Wh/l].

Through such functionalizations it is possible, moreover, advantageously, to obtain good solubility in polar solvents, such as water. The good water-solubility makes it possible, moreover, advantageously to lessen organic solvents, such as N-methyl-2-pyrrolidone, or even to do without them.

As well as the lithium ion conductivity and water-solubility, moreover, such functionalizations may, advantageously, also improve further the binding of the active material.

Overall, then, through functionalizations of these kinds, it is possible to obtain high electrical conductivity, high lithium ion conductivity, good solubility in polar solvents, in particular good water-solubility, good adhesion or binding of the active material, and good adhesion or binding of the active material to metal foils.

In a further, additional or alternative configuration, therefore, at least one of the substituents R1, R2, R3, R4, R11, R12, R13, R14, R15, R16, R17, R18, R11', R12', R13', R14', R15', R16', R17', R18', R21, R22, R31 and R32, more particularly R1, R2, R3 and/or R4, and/or R21 and/or R22, and/or R31 and/or R32, and/or R11, R12, R13, R14, R15, R16, R17, R18, R11', R12', R13', R14', R15', R16', R17' and/or R18', is —OH, —SH, —COOH, —SO₃H, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li. For example it is possible for two or more, optionally all, substituents R1, R2, R3, R4, R11, R12, R13, R14, R15, R16, R17, R18, R11', R12', R13', R14', R15', R16', R17', R18', R21, R22, R31 and R32, more particularly R1, R2, R3 and/or R4, and/or R21 and/or R22, and/or R31 and/or R32, and/or R11, R12, R13, R14, R15, R16, R17, R18, R11', R12', R13', R14', R15', R16', R17' and/or R18', to be —OH, —SH, —COOH, —SO₃H, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li.

Through functionalization with —OH, —SH, —COOH, —SO₃H, —NO₃, —NO₂, an alkyl group functionalized with —OH, —SH, —COOH, —SO₃H, —NO₃ and/or —NO₂, an alkyl group with ester function, —OLi, —SLi, —COOLi, —SO₃Li, or an alkyl group functionalized with —OLi, —SLi, —COOLi and/or —SO₃Li, it is possible, advantageously, to increase further the solubility in polar solvents, by comparison with alkyl groups with ether function and alkoxy groups.

Through functionalization with —OH, —SH, —COOH, —SO₃H, —NO₃, —NO₂, an alkyl group functionalized with —OH, —SH, —COOH, —SO₃H, —NO₃ and/or —NO₂, —OLi, —SLi, —COOLi, —SO₃Li, or an alkyl group functionalized with —OLi, —SLi, —COOLi and/or —SO₃Li, it is even possible, advantageously, to increase still further the water-solubility, again by comparison with alkyl groups with ester function.

Through functionalization with —OH, —SH, —COOH, —SO₃H, —NO₃, —NO₂, an alkyl group functionalized with —OH, —SH, —COOH, —SO₃H, —NO₃ and/or —NO₂, —OLi, —SLi, —COOLi, —SO₃Li, or an alkyl group functionalized with —OLi, —SLi, —COOLi and/or —SO₃Li, it is possible, advantageously, to obtain very high lithium ion conductivity.

Through functionalization with —OLi, —SLi, —COOLi, —SO₃Li, or an alkyl group functionalized with —OLi, —SLi, —COOLi and/or —SO₃Li, it is possible, advantageously, to obtain very good lithium ion conductivity and, in particular, a consumption of lithium ions, for example by exchange of protons with lithium ions from an electrolyte and/or from the active material, for example cathode active material and/or anode active material, and release of protons in the cell and also, optionally, associated side-reactions can be avoided.

Through functionalization with —NO₃, —NO₂, or an alkyl group functionalized with —NO₃ and/or —NO₂, it is possible, advantageously, to obtain good lithium ion conductivity and in particular, again, consumption of lithium ions, for example by exchange of protons with lithium ions from an electrolyte and/or from the active material, for example cathode active material and/or anode active material, and release of protons in the cell and also, optionally, associated side-reactions can be avoided.

Through functionalization with —OH, —SH, an alkyl group functionalized with —OH and/or —SH, —OLi, —SLi, or an alkyl group functionalized with —OLi and/or —SLi, it is possible, advantageously, to obtain good lithium ion conductivity.

If the at least one polymeric binder comprises a polyphenylene, it is possible in particular for at least one of the substituents R1, R2, R3 and R4, more particularly R1, R2, R3 and/or R4, to be —OH, —SH, —COOH, —SO$_3$H, —NO$_3$ or —NO$_2$, or an alkyl group functionalized with (at least one) —OH, —SH, —COOH, —SO$_3$H, —NO$_3$ and/or —NO$_2$, or an alkyl group with ester function and/or ether function, or an alkoxy group, or —OLi, —SLi, —COOLi or —SO$_3$Li, or an alkyl group functionalized with (at least one) —OLi, —SLi, —COOLi and/or —SO$_3$Li.

In particular it is possible here for R1, R2, R3 and/or R4 to be —OH, —SH, —COOH, —SO$_3$H, —NO$_3$ or —NO$_2$, or an alkyl group functionalized with (at least one) —OH, —SH, —COOH, —SO$_3$H, —NO$_3$ and/or —NO$_2$, or an alkyl group with ester function and/or ether function, for example ester function, or —OLi, —SLi, —COOLi or —SO$_3$Li, or an alkyl group functionalized with (at least one) —OLi, —SLi, —COOLi and/or —SO$_3$Li.

If the at least one polymeric binder comprises a polypyrrole, it is possible in particular for at least one of the substituents R21 and R22, more particularly R21 and/or R22, to be —OH, —SH, —COOH, —SO$_3$H, —NO$_3$ or —NO$_2$, or an alkyl group functionalized with (at least one) —OH, —SH, —COOH, —SO$_3$H, —NO$_3$ and/or —NO$_2$, or an alkyl group with ester function and/or ether function, or an alkoxy group, or —OLi, —SLi, —COOLi or —SO$_3$Li, or an alkyl group functionalized with (at least one) —OLi, —SLi, —COOLi and/or —SO$_3$Li. In particular it is possible here for R21 and/or R22 to be —OH, —SH, —COOH, —SO$_3$H, —NO$_3$ or —NO$_2$, or an alkyl group functionalized with (at least one) —OH, —SH, —COOH, —SO$_3$H, —NO$_3$ and/or —NO$_2$, or an alkyl group with ester function and/or ether function, for example ester function, or —OLi, —SLi, —COOLi or —SO$_3$Li, or an alkyl group functionalized with (at least one) —OLi, —SLi, —COOLi and/or —SO$_3$Li.

If the at least one polymeric binder comprises a polythiophene, at least one of the substituents R31 and R32, more particularly R31 and/or R32, may for example be —OH, —SH, —COOH, —SO$_3$H, —NO$_3$ or —NO$_2$, more particularly —SH, —COOH, —NO$_3$ or —NO$_2$, or an alkyl group functionalized with (at least one) —OH, —SH, —COOH, —SO$_3$H, —NO$_3$ and/or —NO$_2$, more particularly —SH, —COOH, —NO$_3$ and/or —NO$_2$, or an alkyl group with ester function and/or ether function, more particularly ester function, or an alkoxy group, or —OLi, —SLi, —COOLi or —SO$_3$Li, more particularly —OLi, —SLi or —COOLi, for example —SLi and/or —COOLi, or an alkyl group functionalized with (at least one) —OLi, —SLi, —COOLi and/or —SO$_3$Li, more particularly —OLi, —SLi and/or —COOLi, for example —SLi and/or —COOLi. Here, for example, R31 and/or R32 may be —OH, —SH, —COOH, —SO$_3$H, —NO$_3$ or —NO$_2$, more particularly —SH, —COOH, —NO$_3$ or —NO$_2$, or an alkyl group functionalized with (at least one) —OH, —SH, —COOH, —SO$_3$H, —NO$_3$ and/or —NO$_2$, more particularly —SH, —COOH, —NO$_3$ and/or —NO$_2$, or an alkyl group with ester function and/or ether function, more particularly ester function, or —OLi, —SLi, —COOLi or —SO$_3$Li, more particularly —OLi, —SLi or —COOLi, for example —SLi and/or —COOLi, or an alkyl group functionalized with (at least one) —OLi, —SLi, —COOLi and/or —SO$_3$Li, more particularly —OLi, —SLi and/or —COOLi, for example —SLi and/or —COOLi.

If the at least one polymeric binder comprises a polyaniline, at least one of the substituents R11, R12, R13, R14, R15, R16, R17, R18, R11', R12', R13', R14', R15', R16', R17' and R18', more particularly R11, R12, R13, R14, R15, R16, R17, R18, R11', R12', R13', R14', R15', R16', R17' and/or R18', may for example be —OH, —SH, —COOH, —SO$_3$H, —NO$_3$ or —NO$_2$, more particularly —OH, —SH, —NO$_3$ or —NO$_2$, or an alkyl group functionalized with (at least one) —OH, —SH, —COOH, —SO$_3$H, —NO$_3$ and/or —NO$_2$, more particularly —OH, —SH, —NO$_3$ and/or —NO$_2$, or an alkyl group with ester function and/or ether function, more particularly ester function, or an alkoxy group, or —OLi, —SLi, —COOLi or —SO$_3$Li, more particularly —OLi or —SLi, or an alkyl group functionalized with (at least one) —OLi, —SLi, —COOLi and/or —SO$_3$Li, more particularly —OLi and/or —SLi. Here, for example, at least one of the substituents R11, R12, R13, R14, R15, R16, R17, R18, R11', R12', R13', R14', R15', R16', R17' and/or R18' may be —OH, —SH, —COOH, —SO$_3$H, —NO$_3$ or —NO$_2$, more particularly —OH, —SH, —NO$_3$ and/or —NO$_2$, or an alkyl group functionalized with (at least one) —OH, —SH, —COOH, —SO$_3$H, —NO$_3$ and/or —NO$_2$, more particularly —OH, —SH, —NO$_3$ and/or —NO$_2$, or an alkyl group with ester function and/or ether function, more particularly ester function, or —OLi, —SLi, —COOLi or —SO$_3$Li, more particularly —OLi or —SLi, or an alkyl group functionalized with (at least one) —OLi, —SLi, —COOLi and/or —SO$_3$Li, more particularly —OLi and/or —SLi.

In a further configuration of these embodiments, at least one of the substituents R1, R2, R3, R4, R11, R12, R13, R14, R15, R16, R17, R18, R11', R12', R13', R14', R15', R16', R17', R18', R21, R22, R31 and R32, more particularly R1, R2, R3 and/or R4, and/or R21 and/or R22, and/or R31 and/or R32, and/or R11, R12, R13, R14, R15, R16, R17, R18, R11', R12', R13', R14', R15', R16', R17' and/or R18', is —SH, —NO$_3$ or —NO$_2$, or an alkyl group functionalized with (at least one) —OH, —SH, —COOH, —SO$_3$H, —NO$_3$ and/or —NO$_2$, more particularly —SH, —NO$_3$ and/or —NO$_2$, or an alkyl group with ester function, or —SLi, or an alkyl group functionalized with (at least one) —OLi, —SLi, —COOLi and/or —SO$_3$Li, more particularly —SLi.

Since polyphenylenes, polypyrroles, polyanilines, polythiophenes, particularly of the general, chemical formulae above, and their lithium salts are electrically conductive, it is possible, advantageously, to omit the addition of electrical conductive additives for increasing the electrical conductivity, such as conductive carbon black, for example acetylene black and/or industrial carbon black.

In a further embodiment, therefore, the material is free from conductive carbon black. The material may be free, for example, from acetylene black and industrial carbon black.

Since polyphenylenes, polypyrroles, polyanilines, polythiophenes, more particularly of the general, chemical formulae above, and their lithium salts may also be ionically conductive, more particularly conducting lithium ions, it is optionally also possible to omit the addition of conductive additives conducting lithium ions, in order to increase the lithium ion conductivity.

Optionally, therefore, the material may be free from electrical conductive additives and/or from conductive additives conducting lithium ions.

In a further embodiment, the at least one active material is a lithium intercalation material which is reversibly intercalatable (and deintercalatable) with lithium ions.

In a further embodiment, the material is an anode material. The at least one active material in this case may be selected, for example, from the group consisting of graphite, amorphous carbon, lithium titanates ($Li_4Ti_5O_{12}$) and lithium alloys, for example lithium-aluminum alloys (LiAl) and/or lithium-tin alloys ($Li_{4.4}Sn$) and/or lithium-silicon alloys ($Li_{4.4}Si$).

In a further embodiment, the material is a cathode material. In this case the at least one active material may be selected, for example, from the group consisting of oxides, more particularly lithium-containing transition metal oxides, for example lithium cobalt oxide ($LiCoO_2$) and/or lithium manganese spinel ($LiMn_2O_4$), and phosphates, more particularly lithium-containing transition metal phosphates, for example lithium iron phosphate ($LiFePO_4$) and/or lithium nickel phosphate ($LiNiPO_4$).

In a further embodiment, the material, based on the total weight of the solids of the material, comprises ≥2 wt % to ≤5 wt % of the at least one binder and/or of the lithium salt of the at least one binder (in total). Advantageously, the at least one polymeric binder, compared with conventional anode or cathode compositions, which generally contain about 90 wt % of active material, about 5 wt % of binder and about 5 wt % of conductive additive, in a solvent or solvent mixture, for example, can be used in a small amount and, accordingly, the binder fraction in the material can be reduced. A reduced binder fraction here makes it possible, advantageously, to lower the weight of the material and/or to raise the fraction of active material, in the same weight or volume, for example, and so to raise the specific power [W/kg] or power density [W/l] and the specific energy [W/kg] or energy density [Wh/l].

In a further embodiment, the material, based on the total weight of the solids of the material, comprises ≥95 wt % to ≤98 wt % of the at least one active material. In this way it is possible, advantageously, to obtain a high specific power [W/kg] or power density [W/l] and specific energy [W/kg] or energy density [Wh/l].

In order to produce an electrode with the at least one polymeric binder, it is possible, for example, for about ≥95 wt % to ≤98 wt % of active material and about ≥2 wt % to ≤5 wt % of the at least one polymeric binder and/or of the lithium salt of the at least one polymeric binder to be dispersed and/or dissolved in water.

Additionally provided as well, therefore, is a method for producing an anode or cathode of a lithium cell, for example lithium ion cell, in which ≥95 wt % to ≤98 wt % of at least one active material and ≥2 wt % to ≤5 wt % of at least one polymeric binder, more particularly an electrically and ionically conducting binder, selected from the group of the polyphenylenes, polypyrroles, polyanilines and/or polythiophenes, more particularly of the general, chemical formulae elucidated above, and lithium salts thereof, are dispersed and/or dissolved in water. In particular here it is possible to carry out mixing so as to give a homogeneous, viscous mass. This mass, by customary methods, for example, may be applied to a metal foil. Subsequently the mass, using customary methods, for example, may be dried.

For further technical features and advantages of the electrode materials of the disclosure, explicit reference is hereby made to the elucidations in connection with the binder materials of the disclosure, the disclosed use, and the lithium cell of the disclosure.

Further provided by the disclosure is a polymeric binder material, more particularly for a lithium cell, for example a lithium ion cell. The polymeric binder material may be, for example, a binder material for an electrode material or for an electrode, more particularly an anode material or anode and/or a cathode material or cathode, of a lithium cell, for example of a lithium ion cell. For example, the polymeric binder material may be used as binder in an electrode material of the disclosure, for example anode material and/or cathode material.

In one embodiment, the binder material comprises or is a polyphenylene of the general, chemical formula:

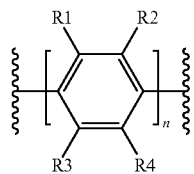

or a lithium salt thereof.

Here, n is more particularly the number of repeating units.

R1, R2, R3 and R4 here may each independently of one another be —H, —OH, —SH, —COOH, —$SO_3H$, —$NO_3$ or —$NO_2$, or an alkyl group functionalized with (at least one) —OH, —SH, —COOH, —$SO_3H$, —$NO_3$ and/or —$NO_2$, or an alkyl group with ester function and/or ether function, or an alkoxy group, or —OLi, —SLi, —COOLi, or —$SO_3Li$, or an alkyl group functionalized with (at least one) —OLi, —SLi, —COOLi and/or —$SO_3Li$.

In particular here it is possible for at least one of the substituents R1, R2, R3 and R4, more particularly R1, R2, R3 and/or R4, to be —OH, —SH, —COOH, —$SO_3H$, —$NO_3$ or —$NO_2$, or an alkyl group functionalized with (at least one) —OH, —SH, —COOH, —$SO_3H$, —$NO_3$ and/or —$NO_2$, or an alkyl group with ester function and/or ether function, or an alkoxy group, or —OLi, —SLi, —COOLi or —$SO_3Li$, or an alkyl group functionalized with (at least one) —OLi, —SLi, —COOLi and/or —$SO_3Li$.

For example it is possible for at least one of the substituents R1, R2, R3 and R4, more particularly R1, R2, R3 and/or R4, to be —SH, —$NO_3$ or —$NO_2$, or an alkyl group functionalized with (at least one) —OH, —SH, —COOH, —$SO_3H$, —$NO_3$ and/or —$NO_2$, or an alkyl group with ester function, or —SLi, or an alkyl group functionalized with (at least one) —OLi, —SLi, —COOLi and/or —$SO_3Li$.

In an alternative or additional embodiment, the binder material comprises or is a polyaniline of the general, chemical formula:

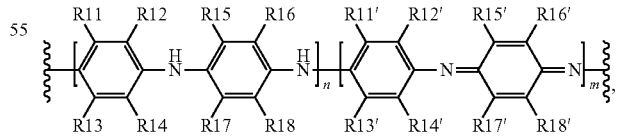

or a lithium salt thereof.

Here, n and m are more particularly the number of repeating units.

R11, R12, R13, R14, R15, R16, R17, R18, R11', R12', R13', R14', R15', R16', R17' and R18' here may in each case independently of one another be —H, —OH, —SH, —COOH, —$SO_3H$, —$NO_3$ or —$NO_2$, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li.

More particularly it is possible for at least one of the substituents R11, R12, R13, R14, R15, R16, R17, R18, R11', R12', R13', R14', R15', R16', R17' and R18', more particularly R11, R12, R13, R14, R15, R16, R17, R18, R11', R12', R13', R14', R15', R16', R17' and/or R18', to be —OH, —SH, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi or —SLi, or an alkyl group functionalized with (at least one) —OLi, —SLi, —COOLi and/or —SO₃Li.

For example at least one of the substituents R11, R12, R13, R14, R15, R16, R17, R18, R11', R12', R13', R14', R15', R16', R17' and R18', more particularly R11, R12, R13, R14, R15, R16, R17, R18, R11', R12', R13', R14', R15', R16', R17' and/or R18', may be —SH, —NO₃ or —NO₂, or an alkyl group functionalized with (at least one) —OH, —SH, —COOH, —SO₃H, —NO₃ and/or —NO₂, or an alkyl group with ester function, or —SLi, or an alkyl group functionalized with (at least one) —OLi, —SLi, —COOLi and/or —SO₃Li.

In one alternative or additional embodiment, the binder material comprises or is a polypyrrole of the general, chemical formula:

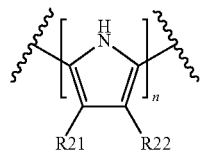

or a lithium salt thereof. Here, n is more particularly the number of repeating units. R21 and R22 here may in each case independently of one another be —H, —OH, —SH, —COOH, —SO₃H, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li.

More particularly it is possible for at least one of the substituents R21 and R22, more particularly R21 and/or R22, to be —OH, —SH, —COOH, —SO₃H, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li.

For example it is possible for at least one of the substituents R21 and R22, more particularly R21 and/or R22, to be —SH, —NO₃ or —NO₂, or an alkyl group functionalized with (at least one) —OH, —SH, —COOH, —SO₃H, —NO₃ and/or —NO₂, or an alkyl group with ester function, or —SLi, or an alkyl group functionalized with (at least one) —OLi, —SLi, —COOLi and/or —SO₃Li.

In one alternative or additional embodiment, the binder material comprises or is a polythiophene of the general, chemical formula:

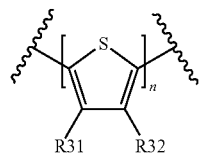

or a lithium salt thereof. Here, n is more particularly the number of repeating units. R31 and R32 here may in each case independently of one another be —H, —OH, —SH, —COOH, —SO₃H, —NO₃ or —NO₂, or an alkyl group functionalized with (at least one) —OH, —SH, —COOH, —SO₃H, —NO₃ and/or —NO₂, or an alkyl group with ester function and/or ether function, or an alkoxy group, or —OLi, —SLi, —COOLi or —SO₃Li, or an alkyl group functionalized with (at least one) —OLi, —SLi, —COOLi and/or —SO₃Li.

More particularly at least one of the substituents R31 and R32, more particularly R31 and/or R32, may be —SH, —COOH, —NO₃ or —NO₂, or an alkyl group functionalized with (at least one) —OH, —SH, —COOH, —SO₃H, —NO₃ and/or —NO₂, or an alkyl group with ester function, or —SLi or —COOLi, or an alkyl group functionalized with (at least one) —OLi, —SLi, —COOLi and/or —SO₃Li.

For example it is possible for at least one of the substituents R31 and R32, more particularly R31 and/or R32, to be —SH, —NO₃ or —NO₂, or an alkyl group functionalized with (at least one) —OH, —SH, —COOH, —SO₃H, —NO₃ and/or —NO₂, or an alkyl group with ester function, or —SLi, or an alkyl group functionalized with (at least one) —OLi, —SLi, —COOLi and/or —SO₃Li.

For further technical features and advantages of the binder material of the disclosure, explicit reference is hereby made to the elucidations in connection with the electrode materials of the disclosure, the disclosed use, and the lithium cell of the disclosure.

Additionally provided is the use of a binder material of the disclosure in a lithium cell, for example lithium ion cell, and/or for producing a lithium cell, for example lithium ion cell.

For further technical features and advantages of the disclosed use, reference is hereby made explicitly to the elucidations in connection with the electrode materials of the disclosure, the binder materials of the disclosure, and the lithium cell of the disclosure.

Additionally provided is a lithium cell, more particularly lithium ion cell, which comprises an electrode material of the disclosure and/or a binder material of the disclosure.

In one embodiment the cell comprises an electrolyte. The electrolyte may comprise more particularly at least one conductive salt, selected for example from the group consisting of lithium hexafluorophosphate (LiPF₆), lithium perchlorate (LiClO₄), lithium tetrafluoroborate (LiBF₄), lithium hexafluoroarsenate (LiAsF₆), and lithium bisoxalatoborate (LiBC₄O₈), more particularly lithium hexafluorophosphate (LiPF₆), and at least one electrolyte solvent, more particularly a mixture of electrolyte solvents, selected for example from the group consisting of ethylene carbonate, propylene carbonate, dimethyl carbonate, dimethylethyl carbonate, and tetra(ethylene glycol) dimethyl ether, and also, optionally, at least one additive, for example vinylene carbonate.

For further technical features and advantages of the cell of the disclosure, explicit reference is hereby made to the elucidations in connection with the electrode materials of the disclosure, the binder material of the disclosure, and the disclosed use thereof.

What is claimed is:

1. An electrode material for one of an anode and a cathode for a lithium cell, comprising:
   at least one active material, and
   at least one electrically conducting polymeric binder selected from polyphenylenes of the general, chemical formula:

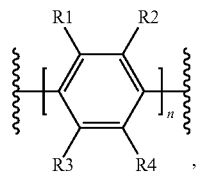

and lithium salts thereof,
   wherein n is the number of repeating units,
   wherein R4 each independently of one another are —H, —OH, —SH, —COOH, —SO$_3$H, —NO$_3$, or —NO$_2$, or an alkyl group functionalized with —OH, —SH, —COOH, —SO$_3$H, —NO$_3$, and/or —NO$_2$, or an alkyl group with ester function and/or ether function, or an alkoxy group, or —OLi, —SLi, —COOLi, or —SO$_3$Li, or an alkyl group functionalized with —OLi, —SLi, —COOLi, and/or —SO$_3$Li, except that R4 is never —H,
   wherein R1, R2, and R3, each independently of one another are —OH, —SH, —COOH, —SO$_3$H, —NO$_3$, or an alkyl group functionalized with —OH, —SH, —COOH, —SO$_3$H, and/or —NO$_3$, or —OLi, —SLi, —COOLi, or —SO$_3$Li, or an alkyl group functionalized with —OLi, —SLi, —COOLi, and/or —SO$_3$Li,
   wherein at least one of the substituents R1, R2, R3, and R4 is —OH, —SH, —COOH, —SO$_3$H, —NO$_3$, or an alkyl group functionalized with —OH, —SH, —COOH, —SO$_3$H, —NO$_3$, and/or —NO$_2$, or an alkyl group with ester function and/or ether function, or an alkoxy group, or —OLi, —SLi, —COOLi, or —SO$_3$Li, or an alkyl group functionalized with —OLi, —SLi, —COOLi, and/or —SO$_3$Li.

2. The material according to claim 1,
   wherein the material, based on the total weight of the solids of the material, comprises ≥2 wt % to ≤5 wt % of the at least one binder and/or the lithium salt of the at least one binder, and
   wherein the material, based on the total weight of solids of the material, comprises ≥95 wt % to ≤98 wt % of the at least one active material.

3. The material according to claim 2, wherein the material, based on the total weight of solids of the material, comprises ≥95 wt % to ≤98 wt % of the at least one active material.

4. The material according to claim 1, wherein the material is free from conductive carbon black.

5. The material according to claim 1, wherein the at least one active material is a lithium intercalation material reversibly intercalatable with lithium ions.

6. The material according to claim 1, wherein the material is an anode material, and wherein the at least one active material is selected from the group consisting of graphite, amorphous carbon, lithium titanates and lithium alloys.

7. The material according to claim 1, wherein the material is a cathode material, and wherein the at least one active material is selected from the group consisting of oxides and phosphates.

8. A polymeric binder material for a lithium cell, comprising a polyphenylene of the general, chemical formula:

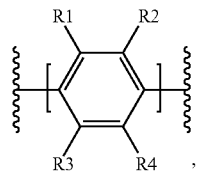

or a lithium salt thereof,
wherein n is the number of repeating units,
wherein R1, R2, and R3, each independently of one another are —OH, —SH, —COOH, —SO$_3$H, —NO$_3$, or an alkyl group functionalized with —OH, —SH, —COOH, —SO$_3$H, and/or —NO$_3$, or —OLi, —SLi, —COOLi, or —SO$_3$Li, or an alkyl group functionalized with —OLi, —SLi, —COOLi, and/or —SO$_3$Li,
wherein R4 is —OH, —SH, —COOH, —SO$_3$H, —NO$_3$, or —NO$_2$, or an alkyl group functionalized with —OH, —SH, —COOH, —SO$_3$H, —NO$_3$, and/or —NO$_2$, or an alkyl group with ester function and/or ether function, or an alkoxy group, or —OLi, —SLi, —COOLi, or —SO$_3$Li, or an alkyl group functionalized with —OLi, —SLi, —COOLi, and/or —SO$_3$Li,
wherein at least one of the substituents R1, R2, R3, and R4 is —SH, —NO$_3$, or an alkyl group functionalized with —OH, —SH, —COOH, —SO$_3$H, —NO$_3$, and/or —NO$_2$, or an alkyl group with ester function, or —SLi, or an alkyl group functionalized with —OLi, —SLi, —COOLi, and/or —SO$_3$Li.

9. A lithium cell, comprising at least one of: an electrode material for at least one of an anode and a cathode,
   the electrode material comprising at least one active material and at least one electrically conducting, polymeric binder selected from
   polyphenylenes of the general, chemical formula:

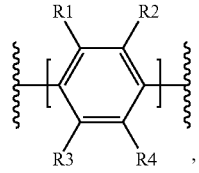

and lithium salts thereof,
wherein n is the number of repeating units,
wherein R4 each independently of one another are —H, —OH, —SH, —COOH, —SO$_3$H, —NO$_3$, or —NO$_2$, or an alkyl group functionalized with —OH, —SH, —COOH, —SO$_3$H, —NO$_3$, and/or —NO$_2$, or an alkyl group with ester function and/or ether function, or an alkoxy group, or —OLi, —SLi, —COOLi, or —SO$_3$Li, or an alkyl group functionalized with —OLi, —SLi, —COOLi, and/or —SO$_3$Li, except that R4 is never —H, wherein R1, R2, and R3, each independently of one
another are
—OH, —SH, —COOH, —SO$_3$H, —NO$_3$, or an alkyl
group functionalized with —OH, —SH, —COOH,
—SO$_3$H, and/or —NO$_3$,
or —OLi, —SLi, —COOLi, or —SO$_3$Li, or an alkyl
group functionalized with —OLi, —SLi, —COOLi,
and/or —SO$_3$Li,
wherein at least one of the substituents R1, R2, R3 and R4
is —OH, —SH, —COOH, —SO$_3$H, —NO$_3$, or an
alkyl group functionalized with —OH, —SH,
—COOH, —SO$_3$H, —NO$_3$, and/or —NO$_2$, or an alkyl
group with ester function and/or ether function, or an
alkoxy group, or —OLi, —SLi, —COOLi, or —SO$_3$Li,
or an alkyl group functionalized with —OLi, —SLi,
—COOLi, and/or —SO$_3$Li.

10. The lithium cell according to claim 9, further comprising an electrolyte, wherein the electrolyte comprises at least one conductive salt selected from the group consisting of lithium hexafluorophosphate, lithium perchlorate, lithium tetrafluoroborate, lithium hexafluoroarsenate and lithium bisoxalatoborate, and at least one electrolyte solvent selected from the group consisting of ethylene carbonate, propylene carbonate, dimethyl carbonate, dimethylethyl carbonate and tetra(ethylene glycol) dimethyl ether.

11. An electrode material for one of an anode and a cathode for a lithium cell, comprising:
at least one active material and at least one electrically conducting, polymeric binder selected from
polyphenylenes of the general, chemical formula:

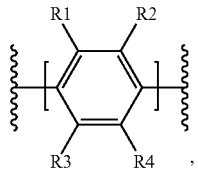

and lithium salts thereof,
wherein n is the number of repeating units,
wherein R4, is —SH, —NO$_3$, or —NO$_2$, or an alkyl group
functionalized with —OH, —SH, —COOH, —SO$_3$H,
—NO$_3$, and/or —NO$_2$, or an alkyl group with ester
function, or —SLi, or an alkyl group functionalized
with —OLi, —SLi, —COOLi, and/or —SO$_3$Li,
wherein R1, R2, and R3, each independently of one
another are —SH, —NO$_3$, or an alkyl group functionalized with —OH, —SH, —COOH, —SO$_3$H, and/or
—NO$_3$, or —OLi, —SLi, —COOLi, or —SO$_3$Li, or an
alkyl group functionalized with —OLi, —SLi,
—COOLi, and/or —SO$_3$Li.

12. The material according to claim 11,
wherein the material, based on the total weight of the
solids of the material, comprises ≥2 wt % to ≤5 wt %
of the at least one binder and/or the lithium salt of the
at least one binder, and
wherein the material, based on the total weight of solids
of the material, comprises ≥95 wt % to ≤98 wt % of the
at least one active material.

13. The material according to claim 12, wherein the material, based on the total weight of solids of the material, comprises ≥95 wt % to ≤98 wt % of the at least one active material.

14. The material according to claim 11, wherein the material is free from conductive carbon black.

15. The material according to claim 11, wherein the at least one active material is a lithium intercalation material reversibly intercalatable with lithium ions.

16. The material according to claim 11, wherein the material is an anode material, and wherein the at least one active material is selected from the group consisting of graphite, amorphous carbon, lithium titanates and lithium alloys.

17. The material according to claim 11, wherein the material is a cathode material, and wherein the at least one active material is selected from the group consisting of oxides and phosphates.

18. A lithium cell, comprising at least one of:
an electrode material for at least one of an anode and a cathode,
the electrode material comprising at least one active material and at least one electrically conducting, polymeric binder selected from
polyphenylenes of the general, chemical formula:

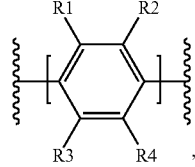

and lithium salts thereof,
wherein n is the number of repeating units,
wherein R4 is —SH, —NO$_3$, or —NO$_2$, or an alkyl group
functionalized with —OH, —SH, —COOH, —SO$_3$H,
—NO$_3$, and/or —NO$_2$, or an alkyl group with ester
function, or —SLi, or an alkyl group functionalized
with —OLi, —SLi, —COOLi, and/or —SO$_3$Li,
wherein R1, R2, and R3, each independently of one
another are
—SH, —NO$_3$, or an alkyl group functionalized with
—OH, —SH, —COOH, —SO$_3$H, —NO$_3$, or —OLi,
—SLi, —COOLi, or —SO$_3$Li, or an alkyl group
functionalized with —OLi, —SLi, —COOLi, and/or
—SO$_3$Li.

19. The lithium cell according to claim 18, further comprising an electrolyte, wherein the electrolyte comprises at least one conductive salt selected from the group consisting of lithium hexafluorophosphate, lithium perchlorate, lithium tetrafluoroborate, lithium hexafluoroarsenate and lithium bisoxalatoborate, and at least one electrolyte solvent selected from the group consisting of ethylene carbonate, propylene carbonate, dimethyl carbonate, dimethylethyl carbonate and tetra(ethylene glycol) dimethyl ether.

* * * * *

UNITED STATES PATENT AND TRADEMARK OFFICE
CERTIFICATE OF CORRECTION

PATENT NO. : 10,862,123 B2  
APPLICATION NO. : 14/566887  
DATED : December 8, 2020  
INVENTOR(S) : F. Eberle et al.

Page 1 of 1

It is certified that error appears in the above-identified patent and that said Letters Patent is hereby corrected as shown below:

On the Title Page

Under FOREIGN PATENT DOCUMENTS: please delete "WO 20101113876 A1" and substitute --WO 2010113876 A1-- therefor.

In the Claims

In Column 16:

Lines 10 to 18 in Claim 8: please delete the formula and substitute -- 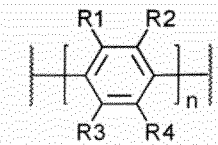 -- therefor.

Lines 49 to 55 in Claim 9: please delete the formula and substitute -- 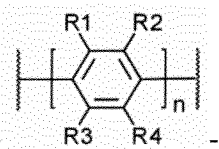 -- therefor.

In Column 17:

Lines 32 to 38 in Claim 11: please delete the formula and substitute -- 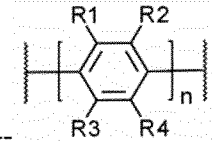 -- therefor.

In Column 18:

Lines 29 to 35 in Claim 18: please delete the formula and substitute -- 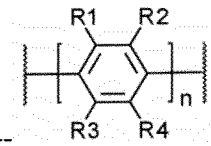 -- therefor.

Signed and Sealed this  
Second Day of March, 2021

Drew Hirshfeld  
*Performing the Functions and Duties of the  
Under Secretary of Commerce for Intellectual Property and  
Director of the United States Patent and Trademark Office*